US008887531B2

(12) United States Patent  
Schmidbauer et al.

(10) Patent No.: US 8,887,531 B2
(45) Date of Patent: Nov. 18, 2014

(54) METHOD FOR PRODUCING A MOLDED GLASS ARTICLE

(75) Inventors: Wolfgang Schmidbauer, Mainz (DE); Erhard Schwarz, Jena (DE); Holger Haustein, Orlamuende (DE); Torsten Gabelmann, Wiesbaden (DE)

(73) Assignee: Schott AG (DE)

( * ) Notice: Subject to any disclaimer, the term of this patent is extended or adjusted under 35 U.S.C. 154(b) by 1107 days.

(21) Appl. No.: 12/334,727

(22) Filed: Dec. 15, 2008

(65) Prior Publication Data

US 2009/0162582 A1    Jun. 25, 2009

(30) Foreign Application Priority Data

Dec. 21, 2007  (DE) .......................... 10 2007 062 979

(51) Int. Cl.
*C03B 25/02*  (2006.01)
*F24C 15/04*  (2006.01)

(52) U.S. Cl.
CPC ................ *C03B 25/02* (2013.01); *F24C 15/04* (2013.01)
USPC .................................. 65/120; 65/119; 65/115

(58) Field of Classification Search
CPC ................................ C03B 25/02; F24C 15/04
USPC ............. 65/90–101, 102–104, 111–115, 194, 65/254, 284
See application file for complete search history.

(56) References Cited

U.S. PATENT DOCUMENTS

| | | | |
|---|---|---|---|
| 2,162,377 A * | 6/1939 | Cone | 65/349 |
| 3,293,020 A * | 12/1966 | Sleighter | 65/111 |
| 3,340,037 A * | 9/1967 | Stevenson | 65/287 |
| 3,574,045 A * | 4/1971 | Mould | 215/400 |
| 3,883,339 A * | 5/1975 | Michalik et al. | 65/114 |
| 4,120,681 A * | 10/1978 | Cross et al. | 65/114 |
| 5,968,219 A * | 10/1999 | Gille et al. | 65/33.8 |
| 6,257,228 B1* | 7/2001 | Braccini | 126/211 |
| 6,502,425 B1* | 1/2003 | Yoshizawa | 65/106 |
| 6,826,929 B2* | 12/2004 | Boaz | 65/114 |
| 6,854,458 B2* | 2/2005 | Herzer | 126/198 |
| 2003/0233846 A1* | 12/2003 | Boaz | 65/114 |
| 2004/0232133 A1* | 11/2004 | Roch et al. | 219/393 |
| 2010/0018253 A1* | 1/2010 | Hsu | 65/33.5 |

FOREIGN PATENT DOCUMENTS

| | | |
|---|---|---|
| DE | 634627 A | 8/1936 |
| DE | 101 05 543 A1 | 8/2002 |
| FR | 1012086 | 7/1952 |
| WO | 03023287 A1 | 3/2003 |

OTHER PUBLICATIONS

German Patent Office Action, German Patent Office, dated Jun. 17, 2008, application serial No. 10 2007 062 979.8-45.
Koevecs, Monika, "EP Application No. 09002247.6 European Search Report Oct. 7, 2011", , Publisher: EPO, Published in: EP.

* cited by examiner

*Primary Examiner* — Jodi C Franklin
(74) *Attorney, Agent, or Firm* — Kaplan Breyer Schwarz & Ottesen, LLP

(57) ABSTRACT

The invention envisions a method for improving the thermal shock resistance of glass objects. For this a glass object is heated starting from a surface temperature under the softening point (42) on the surface of a first side (3) until the viscosity reaches or goes below a value of $10^{(7.65\pm2)}$ poise.

14 Claims, 3 Drawing Sheets

METHOD FOR PRODUCING A MOLDED GLASS ARTICLE

The invention in general concerns glass objects and their production. In particular, the invention concerns glass objects for applications involving high thermal stress.

Glass elements that are exposed to high thermal stresses are found, among other places, in household appliances in the form of the inner panes of cooking ovens.

Cooking ovens have a cooking space with an opening for loading that can be closed by a door. In general, a viewing window is arranged in the door. Modern cooking ovens are already in many cases equipped with pyrolytic self-cleaning. During pyrolytic self-cleaning cooking residues are broken down to ash at pyrolysis temperatures of at least 480° C.

Because of the high temperatures used in the cooking space of the household cooking appliances during pyrolysis, the oven door and thus the viewing window also become correspondingly heated. The viewing window in turn typically consists of a packet of glass panes consisting of at least two glass panes and, in general, a sealed intermediate space between the panes in order to achieve thermal insulation.

In order to achieve the desired pyrolytic cleaning effect in the entire cooking space, the side of the inner pane of the oven door that is turned toward the cooking space should reach the same temperatures as the cooking space itself. Because of these temperature stresses, higher grade glasses are used for the door panes, especially the inner pane in the viewing windows of cooking appliances, particularly baking ovens with pyrolytic self-cleaning.

DE 196 39 241 A1 describes a cooking appliance door for a baking oven with pyrolytic self-cleaning that has a glass pane packet in which the side facing the oven box, or the inner pane, is designed as a flat viewing window with a low coefficient of thermal expansion.

For example, glass ceramic can be used as the window material in this case. The flat inner pane covers the loading opening of the baking oven completely and forms a contact surface to a contact flange, or extends outward over a seal between the glass panes of the glass pane packet. Such panes are also called full-surface panes.

In addition, a cooking appliance door with a glass pane packet in which the inner pane can consist of borosilicate glass or glass ceramic is known from DE 199 50 819 A1. The inner pane likewise covers the loading opening of the cooking space completely and forms a contact surface to a contact flange, or extends over its seal outward. The inner pane, however, is not completely flat, but rather is shaped so that it projects toward the cooking space, in order to compensate stresses rising because of the temperature gradients between the, relatively speaking, cooler edge region and the hotter inner or central region of the inner pane. The inner pane accordingly is vaulted or arched into the inner region. Inner panes with such shapings are, below, also called "arched panes".

DE 101 43 925 A1 likewise describes a baking oven door with spaced panes. The panes in this case are held in a frame-shaped, enameled sheet metal part spaced apart and enclosing an intermediate space. The sheet metal part seals the intermediate space. In this arrangement, because of loss of heat through the sheet metal part in the edge region of the inner pane, optimum cleaning behavior may not result in a pyrolytic self-cleaning.

DE 101 05 543 A1 describes a multipane cooking appliance door with a full-surface inner pane. The inner pane in this case is bent around its edge to form a pan-like shape and is affixed to the front pane by the edge. In this way, the enameled sheet metal part that is otherwise arranged between the front pane and the inner pane and serves to cover the intermediate space can be omitted, which improves the ease of cleaning.

Through the shaping projecting toward the cooking space, compared to a flat glass pane, the central region of the pane tends to be hotter than the edge region. Here there is also the fact that shaped panes generally have lower thermal shock resistance than a flat original glass.

It turned out in practice that moreover the thermal stress is considerably increased through such a pan-like design of the inner pane. However, the increased thermal stress is not supposed to have any failure of the inner pane as a result. A stress test that the inner pane supposed to withstand is described in EN 60335-2-6 ("Safety of Electrical Appliances for Household Use and Similar Purposes").

Part 2-6 ("Special Requirements on Stationary Ranges, Cooktops, Baking Ovens and Similar Appliances"), section 21.104 of this standard describes a heat-shock test of the inner pane, which is explained below. According to section 21.104, glass inserts for baking oven doors with horizontal hinges should withstand the thermal stresses that will probably arise in normal use, which is tested as follows: "The appliance is operated as established in section 11. The door is then opened and 0.2 L of water at a temperature of 15±5° C. is poured onto the central part of the glass insert over a period of 5 seconds. The glass must not break."

Thermal prestressing increases the thermal and mechanical stability of a molded glass object and is described, for example, in DE 101 43 925 A1. Both a mechanical and a thermal increase of the ability to withstand stresses is achieved by the prestressing.

However, prestressing is reversible due to the fact of temperature. The thermal prestressing is very largely degraded because of use as intended, or operation in accordance with said section 11 of EN 60335-2-6, Part 2-6, so that the stress test in accordance with section 21.04 is not reliably passed.

For this reason the invention is based on the task of solving the problems mentioned above. Accordingly, with the invention, an inner pane is to be made available that is clearly improved in its behavior with respect to suddenly occurring temperature shock stresses and that reliably satisfies said standard test in accordance with EN 60335-2-6, Part 2-6, section 21.04.

This task is solved by the object of the independent claims. Advantageous embodiments and further developments of the invention are specified in the relevant dependent claims.

Accordingly, the invention envisions a method for producing a glass object or glass element with improved thermal shock resistance, in which a glass object that has a first side and an opposite second side is molded, where the glass object is heated on the surface of the first side starting from a surface temperature below the softening point until viscosity reaches or exceeds a value of $10^{(7.65\pm2)}$, preferably $10^{(7.65\pm1)}$ poise, so that the thermal shock resistance of the glass object is increased on the first side. The softening point in the sense of the invention and in accordance with the standard ISO 7884-1 is understood to mean the temperature at which the viscosity is $10^{7.65}$ poise. A quenching, as is carried out in the case of thermal prestressing, is omitted.

Surface heating is understood to mean heating with a temperature gradient perpendicular to the heated side. The heating is carried out in particular so that at least a part of the object under the heated surface, preferably the opposite, second side of the glass object, remains at a temperature under the softening point. In this way the shape stability of the produced glass object is guaranteed. Preferably, to guarantee the shape stability, the test starts from a temperature of the glass object at the beginning of heating at which the viscosity is at least $10^9$ poise, especially preferably at least $10^{11}$ poise, particularly preferably at least $10^{12}$ poise.

Surprisingly, it turned out that the brief surface heating in accordance with the invention, in which temperatures in the region of the softening point are reached on the glass surface, leads to a significant and, in particular, irreversible increase of the resistance to temperature differences, or quench resistance, of the glass object.

It is also surprising that even before the surface is heated in accordance with the invention no visible surface defects are detectable externally. Also, the surface is not melted, as in the case of fire polishing, for instance. Rather when the first side is heated on the surface the viscosity of the glass object, in a further development of the invention, remains greater than $10^4$ poise, preferably greater than $10^5$, especially preferably greater than $10^6$ poise. Therefore, in contrast to fire polishing, the temperature remains under the processing point defined in accordance with ISO 7884-1, and is not melted.

Through the method in accordance with the invention, the surface is made just hot enough that the tiniest surface defects are healed, and on the other side, sufficient shape stability continues to exist.

The invention is especially suitable for application to glass panes as glass objects. The glass pane in this case does not have to be completely flat. Rather, in a preferred embodiment of the invention, the pane has been reshaped to a glass molded object. As was already noted in the explanation of the prior art, the problem of reduced thermal quench resistance arises especially in the case of glass panes with edges bent to form a pan-like shape and the use of such a glass pane as the inner pane of a cooking appliance. Through the treatment of the convex, or outwardly arched, side of such a pan-shaped molded glass object that is used as an inner window then the thermal shock stability can be increased to the extent that the glass pane reliably passes a test in accordance with EN 60335-2-6.

Therefore, the invention also envisions an inner pane of a cooking appliance produced by the method in accordance with the invention, which consists of a glass pane with an inner side and an outer side, where the edge of the inner side is bent in a pan shape, so that the inner side of the inner pane is convexly shaped, and at least the central region of the inner side of the inner pane has been treated by surface heating to a temperature at which the viscosity reaches or exceed a value of $10^{(7.65\pm2)}$, preferably $10^{(7.65\pm1)}$ poise, so that the pane withstands a quench test without breaking, where the inner pane is heated by a space that has been heated to at least 240° C. and that is bounded by the inner side of the inner pane, and then 0.2 L water at a temperature of 15±5° C. is poured onto the center of the inner side in a period of 5 seconds. The central region, which is surrounded by the pan-shaped edge, can be flat or arched.

Then one can produce with this inner pane a glass pane packet in particular for a door of a cooking appliance which consists of another pane in addition to the inner pane, where the inner pane with the edge bent to form a pan shape is affixed to the other pane, so that an intermediate space is formed between the two panes. Of course, still other panes can also be provided, for example for better thermal insulation.

It turned out that such an inner pane in accordance with the invention in general withstands even tests with even more severe conditions than those prescribed in the test in accordance with EN 60335-2-6, without breaking. Thus, according to another development of the invention, the inner pane passes the quenching test described above even after the inner pane was heated one or more times to at least 480° C. and then cooled. These are the temperatures that are used in the inner space of a cooking appliance during pyrolytic self-cleaning. The inner pane, in accordance with the invention, is accordingly suitable not only for traditional household cooking appliances, but also for those with pyrolytic self-cleaning and the improvement of the quench resistance is not reversible even under these conditions.

Also, with regard to the temperatures that are used in the cooking space in the quench test, an inner pane in accordance with the invention can clearly exceed the minimum requirements in accordance with EN 60335-2-6. Thus, according to another development of the invention, the inner pane even withstands without breaking a quench test in which the inner pane is heated by a space that is heated to 300° C. and that is bounded by the inner side of the inner pane and where then 0.2 liters of water with a temperature of 15±5° C. are poured onto the center of the inner side in a period of 5 seconds.

Since when used as the inner pane of a cooking appliance the bent edge in general is exposed to a lower temperature stress, it is not necessary to heat the pan-shaped edge in accordance with the invention in order to improve the thermal shock resistance. It is an especially good idea if the pan-shaped edge remains at a temperature at which the viscosity reaches at least a value of $10^{13}$ poise. This viscosity provides for the edge region to remain extraordinarily shape-stable.

The heating is preferably carried out very rapidly in order to achieve a decrease of viscosity on the region near the surface that is as limited as possible. For this, the heating can take place starting from a surface temperature under the softening point up to a temperature at which the viscosity reaches or exceeds a value of $10^{(7.65\pm2)}$ poise in one or more heating steps, the length of which is in each case less than 2 sec, measured at a point on the surface. The total time of the heating can also be longer. This is the case, for example, if swept by a local source of heat. Locally, a rapid increase of temperature is achieved as the source sweeps over the surface, while the total time, in contrast, is determined by the time of the single or multiple sweeping operation.

Rapid heating to the desired temperature can be achieved particularly easily when the glass object, at the beginning of the heating of the first side, has already been made available at an elevated temperature, preferably a temperature of at least 200° C., especially preferably a temperature in the range of the lower annealing point or above the lower annealing point. The lower annealing point is the temperature at which the viscosity of the glass has a value of $10^{14.5}$ poise. This adjusts itself in particular when the heating is carried out to a temperature at which the viscosity reaches or exceeds a value of $10^{(7.65\pm2)}$, preferably $10^{(7.65\pm1)}$ poise, at the end of a hot shaping process, and residual heat is still present from the hot shaping process at the beginning of the heating operation.

The post-treatment of a glass object in accordance with the invention is therefore especially preferably carried out directly at the end of the preceding hot shaping process. In the case of a flat glass pane this can be the rolling of the glass, for example. In the case of a pan-shaped glass pane with edge bent up to form the pan shape, the heating in accordance with this embodiment of the invention is carried out directly at the end of the shaping of the glass pane. A draw shaping process is especially suitable for the shaping.

A rapid surface heating to a temperature in the range of the softening point at $10^{(7.65\pm1)}$ poise or beyond can take place in a simple way by heating by means of a local heat source, with which the first side of the glass object is swept. The high power [levels] that are favorable for rapid surface heating while maintaining shape stability are made available in a simple way in this manner.

The heating source can be linear, where the heat source passes over the first side perpendicular to the long direction of the linear heat source. Compared to a point heat source, this eliminates the need for scanning in two directions.

According to a further development of this preferred embodiment of the invention the first side is swept with at least two successively arranged linear heat sources, especially preferably in the form of a burner having at least two rows. Alternatively or in addition, the first side can also be swept at least twice with the line-shaped heat source.

This further development of the invention is expedient when a single sweeping of the heat source over the surface is not sufficient to reach the desired temperature. In particular it can, however, also be a good idea when one must avoid a time-temperature increase profile that is too steep.

The advantageous high local heating power [levels] can also be achieved by heating the first side of the glass object with a burner that has at least one nozzle, the flame of which sweeps over the first side of the glass object. Should a line-shaped heat source with burner as described above be realized in addition to a burner with a line-shaped nozzle, for example a slot nozzle and/or a burner with several nozzles arranged side by side and/or one behind the other in a row can be used.

The thermal shock resistance can additionally be increased still further if stresses in the glass object are removed in a post-heating process, for example, in an annealing oven, or leer oven. This measure stands in sharp contrast to a thermal prestressing to increase the temperature shock resistance, since stresses that are present are relieved, just the opposite of a thermal prestressing. To get rid of mechanical stresses, it is a good idea here to hold the glass object at a temperature in a range above the lower annealing point, preferably between the upper and lower annealing points. The upper annealing point is defined by a viscosity of $10^{13}$ poise.

In the post-heating process the glass object is slowly cooled until it is at least below the lower annealing point. The elimination of stress in the annealing oven takes place as the glass passes through the temperature range between the upper and lower annealing points. This process can take a few minutes up to a few hours, in each case according to the kind of glass and the geometry of the glass object.

In addition there can also be one or more openings present in an inner pane of a cooking appliance made in accordance with the invention without the temperature shock resistance being significantly affected. These openings can be provided in particular in the bent edge of a pan-shaped pane in order to ventilate the intermediate space of the glass pane packet of a cooking appliance door that is enclosed by the concave, or inwardly arched, side. Also, the openings could serve to fasten the inner pane. Another embodiment calls for the opening to be situated in the central area surrounded by the pan-shaped bent edge or in an arched area of the inner pane.

It is a particularly good idea if one starts already with a glass object of high thermal shock resistance. In particular, such glasses are understood to mean glasses that have a thermal coefficient of linear expansion in the range of $1 \times 10^{-6}$ $K^{-1}$ to $10 \times 10^{-6}$ $K^{-1}$, preferably a thermal coefficient of linear expansion in the range of $2 \times 10^{-6}$ $K^{-1}$ to $5 \times 10^{-6}$ $K^{-1}$. Among others, borosilicate glasses are suitable here.

The invention is explained in more detail below by means of embodiment examples, with reference to the accompanying drawings. Here, like reference numbers refer to like or corresponding parts and elements. Here:

Figure 1:
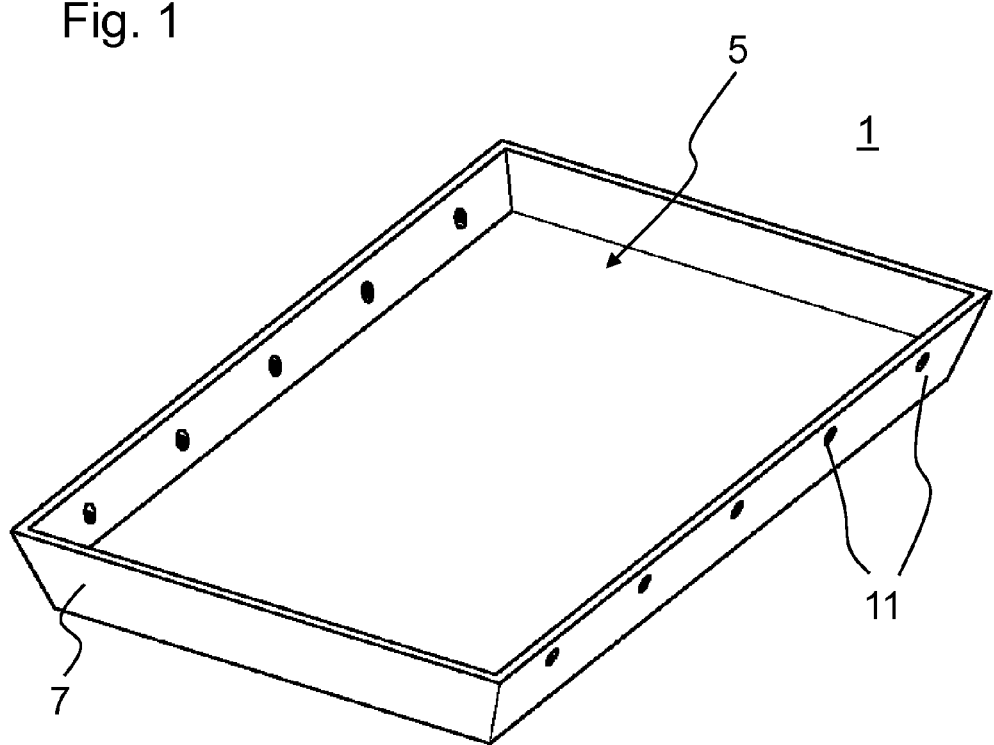
FIG. 1 shows a perspective view of an inner pane of a cooking appliance door with pan-shaped bent edge, looking at the concave side.
Figure 2:
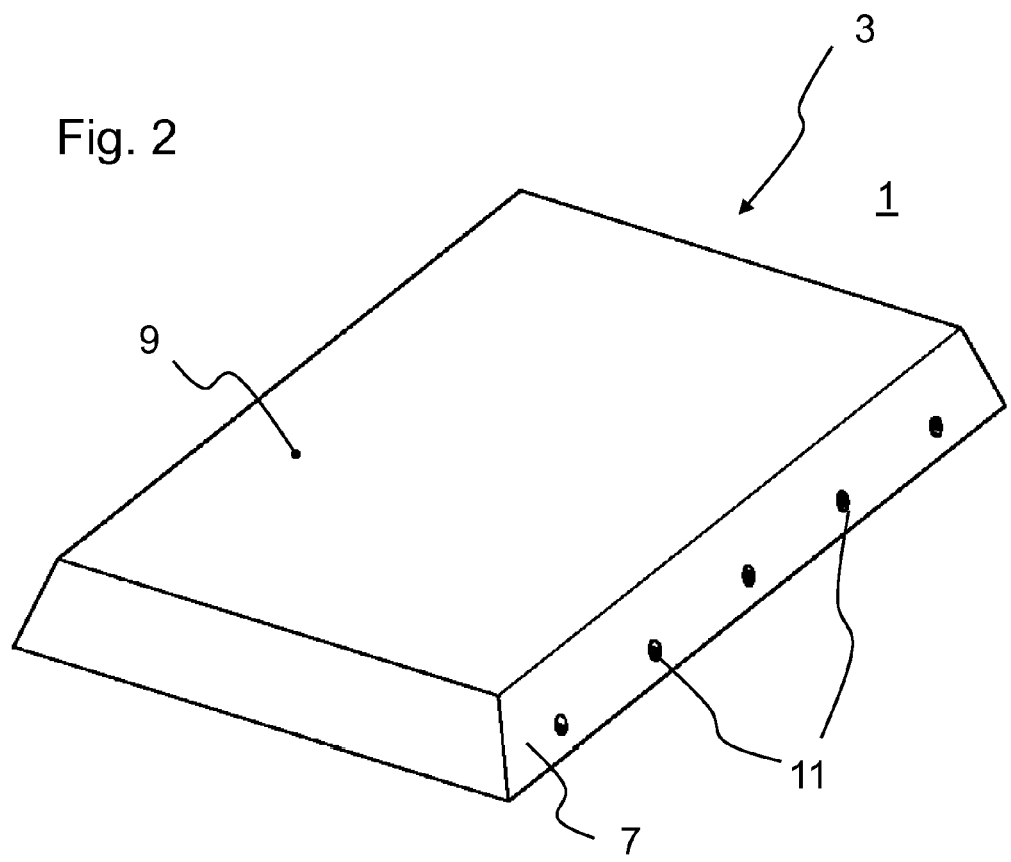
FIG. 2 shows a perspective view of the pane, looking at the convex side.

FIGS. 1 and 2 each show perspective views of a glass pane, post-treated by heating in accordance with the invention, and used as the inner pane of a cooking appliance door or a viewing window of a cooking appliance.

The inner pane 1 is designed as a glass pane with a first side 3 and a second side 5, where the edge 7 of the inner pane 1 is bent to form a pan shape, so that the first side 3 of the inner pane is convexly shaped. The first side 3 forms, in the cooking appliance door, the inner side, thus the side that bounds the cooking space. Correspondingly, the concavely shaped side 5 forms the outer side of the inner pane 1. The central region 9 of the inner pane in the example that is shown is essentially flat. However, it is also possible for this area to have an arch.

In addition, several holes 11 are provided in the bent edge 7 of the inner pane 1, which allow ventilation of the intermediate space between the inner pane 1 and another pane.

The inner pane 1 is preferably made in a hot shaping process from a flat glass pane. Borosilicate glass is particularly suitable for the inner pane 1, because of its relatively high thermal shock resistance.

In order to improve the inner side temperature shock resistance of the inner pane 1 further post-treatment of the central region 9 of the first side is carried out so that at least the central region 9 of the inner side 3 of the inner pane 1 withstands a quench test without breaking, where the inner pane is heated by a space that bounds the inner side of the inner pane and that has been heated to at least 240° C., and where then 0.2 L of water having a temperature of 15±5° C. is poured onto the center of the glass insert in a period of 5 seconds. In this post-treatment the central region is heated on the surface starting from a temperature under the softening point to a temperature at which the viscosity reaches or exceeds a value of $10^{(7.65\pm1)}$ poise, thus in the region of the softening point at $10^{7.65}$ poise, without the glass subsequently being quenched, or rapidly cooled, as is carried out in the case of thermal prestressing, in contrast to the invention.

The post-treatment carried out in this way surprisingly leads a an irreversible improvement of the thermal shock resistance. On the contrary, tests show that in the case of a thermally pre-stressed glass with a temperature action of 500° C. only 10% of the previously introduced stress is still present after 1 hour. In contrast to the invention a glass pane post-treated in this way therefore would very rapidly lose its improved thermal shock resistance when used in a cooking appliance, in particular, a cooking appliance with pyrolytic self-cleaning, in which these temperatures are reached.

Figure 3:
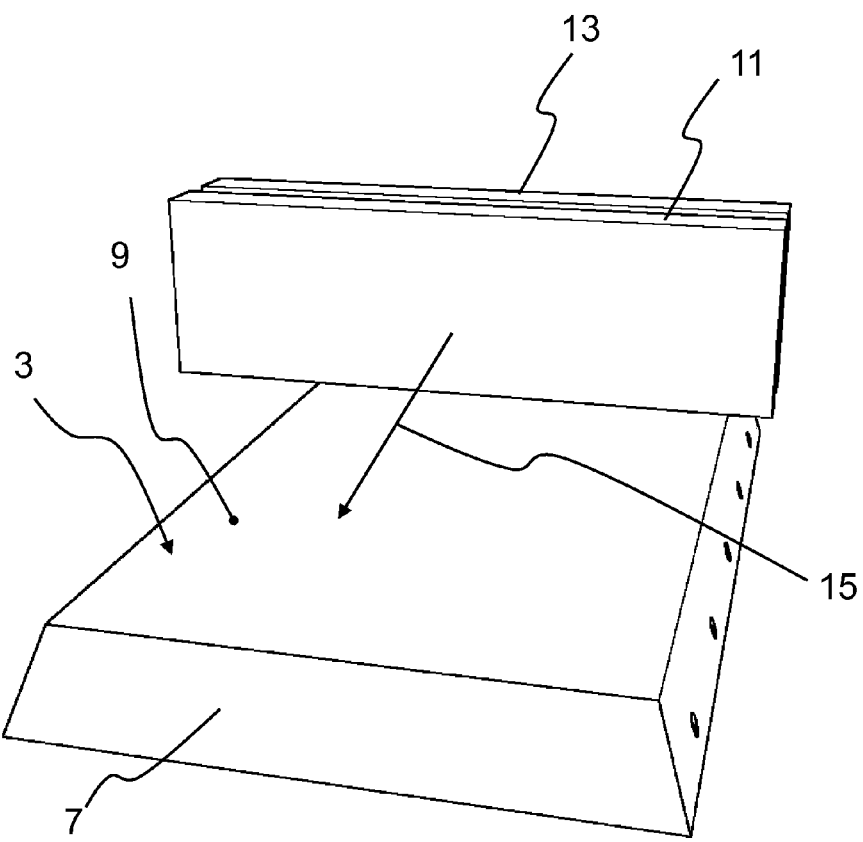
FIG. 3 shows an arrangement to improve the thermal shock resistance by subjecting the inner pane to flame.

FIG. 3 shows the arrangement for surface heating of the central region 9 of side 3 to the corresponding temperatures. Two line-shaped burners 11 and 13 that are arranged one behind the other are used; these burners travel across the first side 3 of the inner pane along the direction perpendicular to the lengthwise direction 15 of the burners. The burners can have slot nozzles or a number of point burner nozzles arranged side by side in a row, the flames of which are directed toward the glass surface. Through the high power of the burners and their local effect, a rapid temperature rise is achieved on the surface without the inner pane reaching a temperature in the region of the softening point all the way through, so that the inner pane remains sufficient shape-stable. The bent edge 7 of the inner pane 1 is in this case not exposed to the flames, so that its shape stability is increased further. Preferably the pan-shaped bent edge 7 remains at a temperature at which the viscosity reaches at least a value of $10^{13}$ poise. Accordingly, the temperature of the edge 7 preferably lies in the range of the upper annealing point or thereunder.

This surface heating is carried out directly at the end of the drawing process with which the bent edge of the inner pane is produced. In this way the residual heat still present from the preceding hot shaping is utilized so that, on the one hand, temperature gradients perpendicular to the surface of the central region 9 that are too high, and thus stresses that additionally arise, are avoided, and on the other hand, the temperature rise needed to achieve the desired viscosity at the surface is reduced. The inner pane 1 can additionally be swept one or more times.

For example, a burner arrangement with a power of 25 KW proved to be suitable. The double-row burner is 350 mm long and 40 mm wide and travels over the inner pane 1 at a distance of 20 mm from its surface at a rate of 60 millimeters per second. Rapid heating of the surface is achieved in this way, and the heating, in each case considered at a specific point on the surface, takes place in one or more steps, the length of which is preferably each less than 2 seconds.

The flame-treated glass surface becomes heated just hot enough that tiny damages are healed, but on the other hand, sufficient shape stability is guaranteed.

Figure 4:
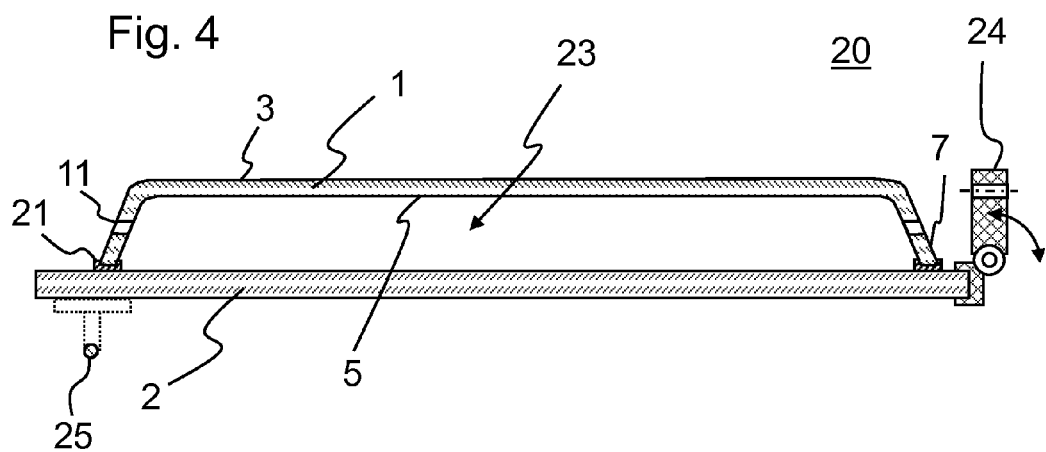
FIG. 4 shows a cross-sectional view of a cooking appliance door.

FIG. 4 shows a cooking appliance door with a glass pane packet 20 in a schematic cross-sectional view. The inner pane 1 is joined to an additional glass pane 2 via a seal 21 at the pan-shaped edge 7, where the concave second side 5 of the inner pane points toward the other pane 2. In this way an intermediate space 23 is formed between the two panes 1 and 2. This intermediate space serves for heat insulation and is ventilated by holes present in edge 7. As a variation from what is shown in FIG. 4, the glass pane packet 20 can also contain still additional glass panes.

In the example shown, a hinge for hinged mounting to the cooking appliance and a handle 25 are affixed to the additional pane 2. In this way the glass pane packet 20 can be used directly as the cooking appliance door without an additional metal frame.

Figure 5:
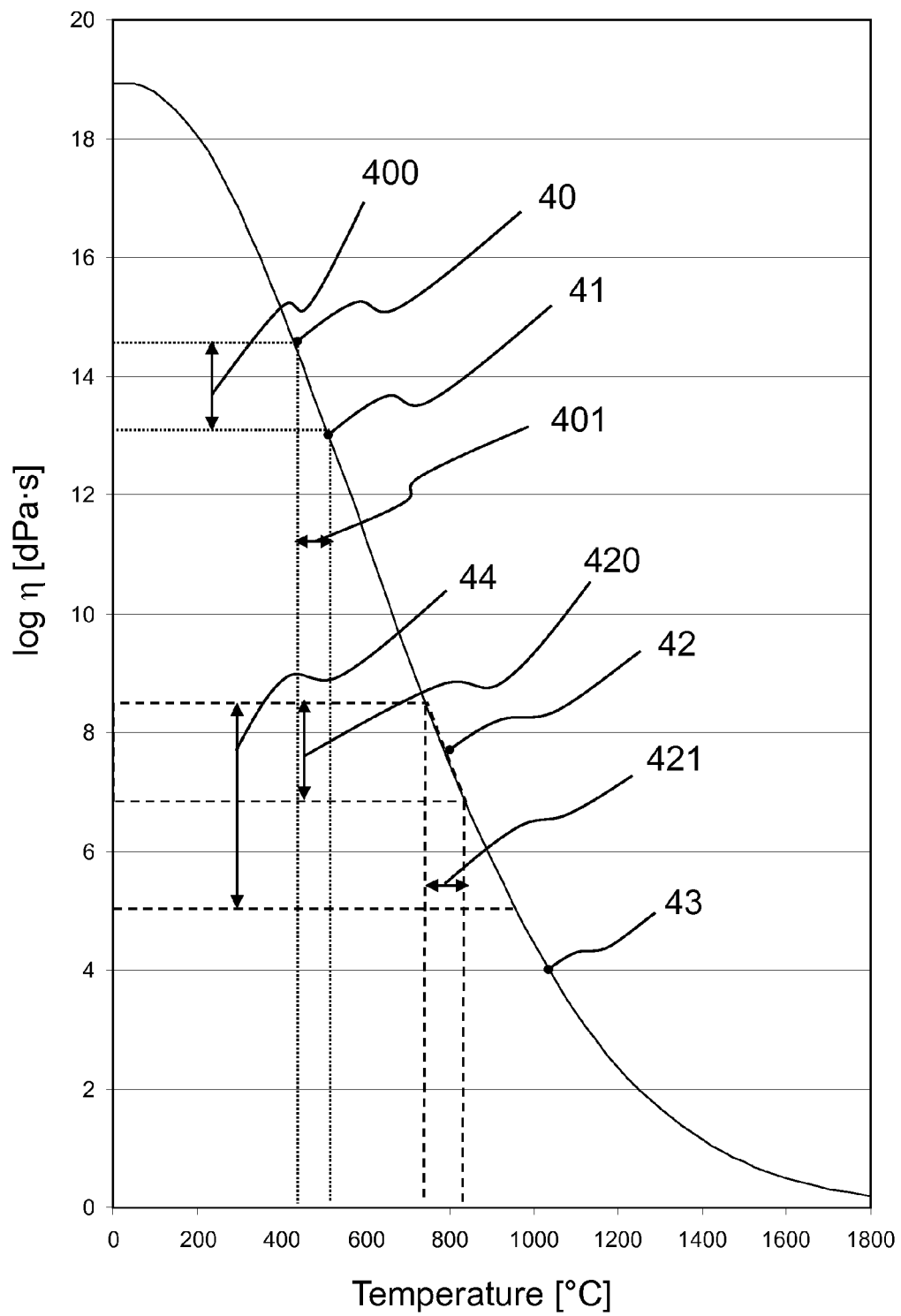
FIG. 5 shows the viscosity curve of a glass in dependence on temperature.

FIG. 5 shows a diagram of the viscosity curve of a glass as a function of temperature. The viscosity curve is hypothetical, but it resembles the typical curve of a borosilicate glass. Various characteristic points on the curve are indicated in the drawing. Point 40 is the lower annealing point at $10^{14.5}$ poise and point 41 characterizes the upper annealing point at $10^{13}$ poise. The viscosity range 400 between these two points is the transformation range.

At the beginning of the heating in accordance with the invention the glass still has residual heat of preferably at least 200° C. Since the inner pane is supposed to remain as shape-stable as possible during the post-treatment in accordance with the invention, inner pane viscosities at the beginning of flame treatment of at least $10^9$ poise, especially preferably at least $10^{11}$ poise, particularly preferably at least $10^{12}$ poise, are favorable. In this case, the temperature can also lie within or above range 401. Range 401 characterizes the temperature range corresponding to the transformation range 400.

After the post-treatment of the first side in accordance with the invention this region 400 is cooled in a slow-cooling and post-heating process, preferably in an annealing oven, where the viscosity passes through the transformation range 400 between annealing points 41 and 40. The flame treatment is followed by a post-heating treatment, in which residual stresses are relieved. This post-treatment can be carried out, for example, in an annealing oven, where the inner pane slowly passes through the temperature range.

The first side 3 of the glass is heated prior to the post-treatment in accordance with the invention to the extent that the glass at the surface reaches or goes below at least a viscosity range 420 around the softening point 42 at a viscosity of $10^{7.65}$ poise. Range 421 characterizes the temperature range corresponding to range 420. In the example shown, range 420 has an expansion of $10^{(7.65\pm1)}$ poise.

Fire polishing takes place with melting of the surface of the glass. Here the glass is heated at least to the processing point 43 at a viscosity of $10^4$ poise, generally to still temperatures, or lower viscosities, so that the surface melts.

In contrast to this, in accordance with the invention, the surface of the first side 3 is not melted and the viscosity remains under the processing point. A favorable range for the heating of the glass surface in accordance with the invention for a nonreversible improvement of the thermal shock resistance is indicated by reference number 44 and ranges from the upper viscosity limit of range 420 to $10^5$ poise.

It is obvious to one skilled in the art that the invention is not limited to the embodiment examples described above, but rather it can be varied in diverse ways. For instance, the thermal shock resistance of glass panes or glass objects other than the inner pane 1 shown in FIGS. 1 and 2 can be improved in a simple way with the method in accordance with the invention. It would also be possible to post-treat an arched belly pane or a flat glass pane.

REFERENCE NUMBERS

1 Inner pane
2 Additional glass pane
3 First side of 1
5 Second side of 1
7 Edge of 1 bent in a pan shape
9 Central region of 1
11 Holes in 7
11, 13 Burners
15 Direction of travel
20 Glass pane packet
21 Seal
23 Intermediate space between 1 and 2
24 Hinge
25 Handle
40 Lower annealing point
41 Upper annealing point
42 Softening point
43 Processing point
44 Favorable viscosity range
400 Transformation range
401 Temperature range corresponding to 400
420 Viscosity range around 42
421 Temperature range corresponding to 420

What is claimed is:

1. A method for producing a glass object in the form of a cooking appliance inner pane with improved thermal shock resistance, the glass object having a first side and an opposite second side and an edge bent in a pan shape, characterized by heating the glass object on the surface of the first side, wherein the heating takes place by means of a local heat source that travels across the first side of the glass object, starting from a surface temperature under the softening point until the viscosity reaches or goes below a first value of $10^{(7.65\pm2)}$ poise, characterized in that the glass object is heated with a temperature gradient perpendicular to the surface so that at least a part of the object under the heated surface remains at a temperature under the softening point, so that the thermal shock resistance of the glass object on the first side is increased, wherein the surface of the first side is not melted by the heating, and wherein the convex side of the pan-shaped glass pane is heated on the first side to improve the thermal shock resistance.

2. The method of claim 1, characterized in that the viscosity of the glass object on the first side when the first side is being heated, remains greater than $10^4$ poise.

3. The method of claim 1, characterized in that when the glass object is heated, one starts from a temperature of the glass object at which the viscosity is at least $10^9$ poise.

4. The method of claim 1, characterized in that the heating, starting from a surface temperature under the softening point to a temperature at which the viscosity reaches or goes below the first value, takes place in one or more heating steps, a length of time which in each case is less than 2 seconds measured at a point of the surface.

5. The method of claim 1, characterized in that the glass object at the beginning of the heating of the first side is made available with an elevated temperature above the lower annealing point.

6. The method of claim 5, characterized in that the heating to a temperature at which the viscosity reaches or goes below the first value is carried out at the end of a hot shaping process, where residual heat from the hot shaping process is still present at the beginning of the heating.

7. The method of claim 1, characterized in a line-shaped heat source is used for the heating, where the first side is swept perpendicular to the long direction of the line-shaped heat source.

8. The method of claim 7, characterized in that the first side is swept by at least two line-shaped heat sources that are arranged one behind the other.

9. The method of claim 1, characterized in that the heating of the first side of the glass object occurs via a burner with at least one nozzle, the flame of which sweeps over the first side of the glass object.

10. The method of claim 9, characterized in that the heating of the first side takes place with a burner with a line-shaped nozzle and/or a burner with a plurality of nozzles arranged side by side and/or one after the other.

11. The method of claim 1, characterized in that the glass object is relieved of stresses in a post-heating process.

12. The method of claim 1, characterized in that the glass object after the heating is held at a temperature in a range above the lower annealing point, in order to eliminate mechanical stresses.

13. The method of claim 1, wherein the glass object before being heated by the local heat source comprises glass that has a thermal coefficient of linear expansion from $1\times10^{-6}$ $K^{-1}$ to $10\times10^{-6}$ $K^{-1}$, thereby improving thermal shock resistance of the glass object after being heated by the local heat source.

14. A method for producing a glass object in the form of a cooking appliance inner pane with improved thermal shock resistance, the glass object having a first side and an opposite second side and an edge bent in a pan shape,
characterized by heating the glass object on the surface of the first side, wherein the heating takes place by means of a local heat source that travels across the first side of the glass object, starting from a surface temperature under the softening point until the viscosity reaches or goes below a first value of $10^{(7.65\pm2)}$ poise, characterized in that the glass object is heated with a temperature gradient perpendicular to the surface so that at least a part of the object under the heated surface remains at a temperature under the softening point, so that the thermal shock resistance of the glass object on the first side is increased,
characterized in that the edge remains at a temperature at which the viscosity reaches at least a value of $10^{13}$ poise.

* * * * *